(12) United States Patent
Neema et al.

(10) Patent No.: US 8,074,077 B1
(45) Date of Patent: Dec. 6, 2011

(54) SECURING CIRCUIT DESIGNS WITHIN CIRCUIT DESIGN TOOLS

(75) Inventors: Hem C. Neema, Sunnyvale, CA (US);
Kumar Deepak, San Jose, CA (US);
Jimmy Zhenming Wang, Saratoga, CA (US)

(73) Assignee: Xilinx, Inc., San Jose, CA (US)

( * ) Notice: Subject to any disclaimer, the term of this patent is extended or adjusted under 35 U.S.C. 154(b) by 1272 days.

(21) Appl. No.: 11/786,954

(22) Filed: Apr. 12, 2007

(51) Int. Cl.
*G06F 12/14* (2006.01)

(52) U.S. Cl. ........................................ 713/189; 713/193

(58) Field of Classification Search .................. 713/189, 713/193
See application file for complete search history.

(56) References Cited

U.S. PATENT DOCUMENTS

| | | | |
|---|---|---|---|
| 5,978,476 A * | 11/1999 | Redman et al. ................. | 705/51 |
| 2002/0138441 A1 * | 9/2002 | Lopatic ............................ | 705/59 |
| 2006/0129627 A1 * | 6/2006 | Phillips et al. ................. | 709/200 |

* cited by examiner

*Primary Examiner* — Benjamin Lanier
*Assistant Examiner* — Devin Almeida
(74) *Attorney, Agent, or Firm* — Kevin T. Cuenot

(57) ABSTRACT

A method of securing a circuit design can include generating a string including a plurality of elements. The plurality of elements can include elements of design information selected from within the circuit design and at least one security element indicating whether the circuit design is protected. The method further can include permuting the plurality of elements of the string, encrypting the permuted string using a key shared with a circuit design tool, and including the permuted and encrypted string within the circuit design.

18 Claims, 2 Drawing Sheets

SECURING CIRCUIT DESIGNS WITHIN CIRCUIT DESIGN TOOLS

BACKGROUND

Modern integrated circuits (ICs) are developed through the use of hardware description languages (HDLs). HDLs such as Verilog®, VHDL®, and the like allow developers to create software-based representations of circuit designs. One advantage of using an HDL is the potential for code reuse from one design to another. This concept has been realized with the commercial availability of intellectual property (IP) cores. In general, an IP core refers to a software representation of a semiconductor, a circuit design, or any portion thereof, that provides a processing function.

IP cores are made available by hardware vendors and other third party suppliers. Presently, there is a strong demand for IP cores as designers use these software components to create and simulate larger circuits and systems. IP cores typically are implemented in an HDL. If distributed in this form, however, any confidential and/or trade secret information relating to the supplier's IP core or the circuit design represented by the IP core would be revealed to third parties. Accordingly, IP core providers have an interest in securing IP cores prior to distribution and protecting the IP cores from reverse engineering.

BRIEF SUMMARY OF THE INVENTION

Embodiments of the present invention are directed to securing and/or protecting circuit designs within circuit design tools. One embodiment of the present invention can include a method of securing a circuit design. The method can include generating a string including a plurality of elements. The plurality of elements can include design information elements selected from within the circuit design and at least one security element indicating whether the circuit design is protected. The elements of the string can be permuted and the permuted string can be encrypted using a key shared with a circuit design tool. The permuted and encrypted string can be included within a protected form of the circuit design.

Another embodiment of the present invention can include a method of providing access to a circuit design within a circuit design tool. The method can include loading a circuit design including a string indicating whether the circuit design is protected and identifying the string within the circuit design. The method also can include decrypting the string using a shared key and selectively allowing access to the circuit design according to a plurality of elements identified within the string, the plurality of elements comprising design information elements of the circuit design and a security element.

Yet another embodiment of the present invention can include a computer program product including a computer-usable medium having computer-usable program code that, when executed by an information processing system, causes the information processing system to perform the various steps and/or functions disclosed herein.

DETAILED DESCRIPTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Embodiments of the present invention relate to securing circuit designs for use with circuit design simulators, circuit design synthesis tools, or other tools used in the circuit design process (collectively "circuit design tools"). A circuit design specified using a hardware description language (HDL) can be provided, typically in a protected form. Within the circuit design, a string can be included which, when interpreted by the circuit design tool, indicates whether the circuit design is protected. The circuit design tool can identify and process the string when the circuit design is loaded, whether as a standalone circuit design or included within a larger system, e.g., as an Intellectual Property (IP) core. Based upon the processing and interpretation of the string, one or more functions of the circuit design tool can be enabled or disabled as the case may be. Interpretation of the string effectively prevents improper or unauthorized access to one or more, or all, portions of the circuit design through the circuit design tool.

Figure 1:
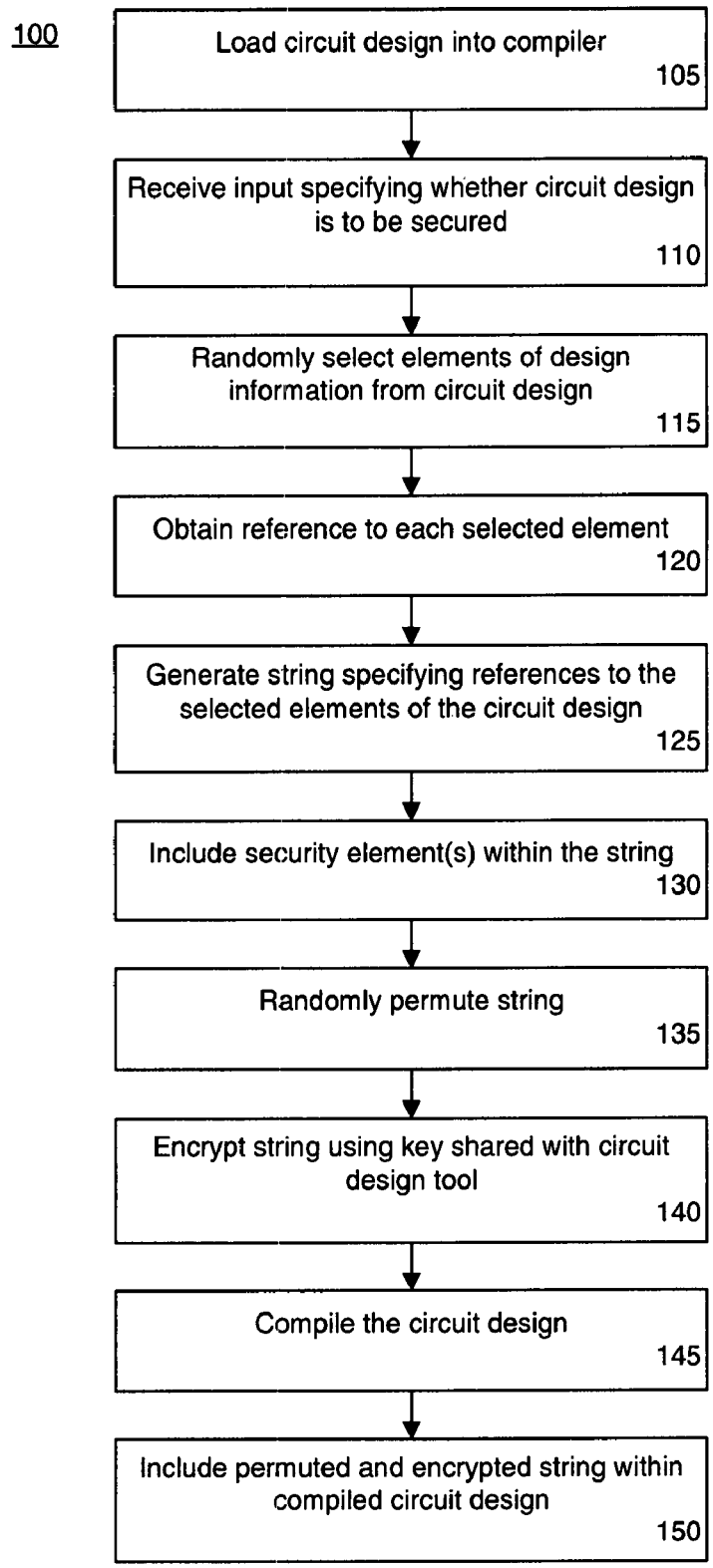
FIG. 1 is a flow chart illustrating a method of securing a circuit design in accordance with one embodiment of the present invention.

FIG. 1 is a flow chart illustrating a method 100 of securing a circuit design in accordance with one embodiment of the present invention. The method 100 can begin in step 105 where a circuit design can be loaded into a compiler. As used herein, a "circuit design" can refer to a programmatic representation of an electrical circuit or any portion of a circuit or other electrical system. For example, a circuit design can refer to an IP core which can cause hardware to be implemented or instantiated within a programmable logic device such as a field programmable gate array or the like. The circuit design can be specified in a hardware description language (HDL) such as Verilog®, VHDL®, or any other language capable of specifying a system. Those skilled in the art will appreciated that any of a variety of different HDLs can be used and that the particular HDL in which the circuit design is specified is not intended to limit the present invention.

In step 110, the compiler can receive an input indicating whether the circuit design is to be protected or otherwise secured. A protected circuit design refers to a circuit design in which one or more aspects of that design are not available to a user, e.g., are hidden, when loaded into a circuit design tool. With respect to a protected, or secured, circuit design, one or more functions of the circuit design tool that typically provide information regarding the inner workings of the circuit design can be disabled. For example, circuit design tool specific functions relating to hierarchy navigation, displaying, tracing, or dumping (e.g., VCD files) of design data which can provide information such as names, connections, hierarchy, or the like of the design can be disabled. Disabling these functions makes the circuit design appear as a "black box" with only input(s) and output(s) being visible within the circuit design tool. Thus, whether included within a larger design or on its own, the inner workings of a protected, or secured, circuit design are unavailable to, or hidden from, the user of the circuit design tool.

In step 115, the compiler can randomly select various elements of design information from the circuit design. For example, these elements can be components of the circuit design including, but not limited to, signals; ports, modules, or any other structures or parameters specified within the circuit design. The number of elements selected can be a predetermined number, e.g., five elements. Fewer or more elements can be selected. In general, the larger the number of elements, the stronger the protection provided to the circuit design. Selecting too many elements, however, can result in an overly burdensome protection scheme when implemented within the circuit design tool.

Each element of design information can be selected at random. In illustration, if five elements are to be selected, the compiler can invoke a random number generator driven by, for example, the system time. The resulting random number can be used to select a circuit component. For instance, the signals of the circuit design can be numbered sequentially and the particular number generated can indicate the selected signal. The process can be repeated for each element of circuit design information to be selected, whether for signals, ports, other components, or various combinations thereof. In one embodiment, one or more components, or component types, can be excluded from consideration during the random selection process. Examples of components that can be excluded can include any components that may have more common, or standardized, names such as "clock", "reset", or the like.

In step 120, a reference to each selected element of design information can be obtained. The reference, for example, can be the name of the selected element as specified within the circuit design. In step 125, the compiler can generate a string from the references of the selected elements. More particularly, the compiler can create a string using the reference to each selected element. In creating the string, a delimiter can be inserted between each reference of the string.

While any of a variety of delimiters can be used, in one embodiment, a space can be used as the delimiter between references when forming the string. In illustration, assume that the compiler has selected the port names "cnt", "ctl", "in1", "in2", and "out1" for use in creating the string. A binary string can be created specifying these circuit elements using a space, or other symbol, as a delimiter.

In step 130, one or more security elements can be added to the string. The security element, or elements as the case may be, can indicate whether the circuit design is to be protected or secured. For example, the security element can be specified according to the input provided in step 110. Thus, the security element can indicate either "protected" or "unprotected". If a plurality of security elements is included, each security element can be indicative of a particular right or privilege. The security element can be added to the string with the selected type of delimiter separating the security element from the other elements. Each security element further can be separated from each other security element by the delimiter. Continuing with the previous example, the string can be "cnt ctl in1 in2 out1 protected".

In step 135, the compiler can randomly permute the string. A random number generator, for example, can be used to select the manner in which the string will be permuted. In one embodiment, the current system time can be used as an input to a random number generator. The resulting random number can be used to specify the reordering of the elements of the string. In any case, after step 135, the order of the elements of the string is randomly altered from the original ordering of the elements. For example, the string, after step 135 can be "ctl cnt protected in2 in1 out1" or any other randomly selected order.

In step 140, the compiler can encrypt the string using any of variety of different encryption algorithms. In one embodiment, the string can be encrypted using a key that is shared among the compiler and any circuit design tools configured, or intended, to execute circuit designs protected in the manner disclosed herein. In step 145, the circuit design can be compiled. Compilation results in an object code representation of the circuit design. This form of the circuit design is protected in the sense that reverse engineering is difficult. It should be appreciated that other "protected" or encrypted forms of the circuit design can be used other than compilation into object code. In step 150, the permuted and encrypted string can be included within the circuit design. The string can be included at a known, or predetermined, location within the circuit design so as to be locatable by the circuit design tool.

Figure 2:
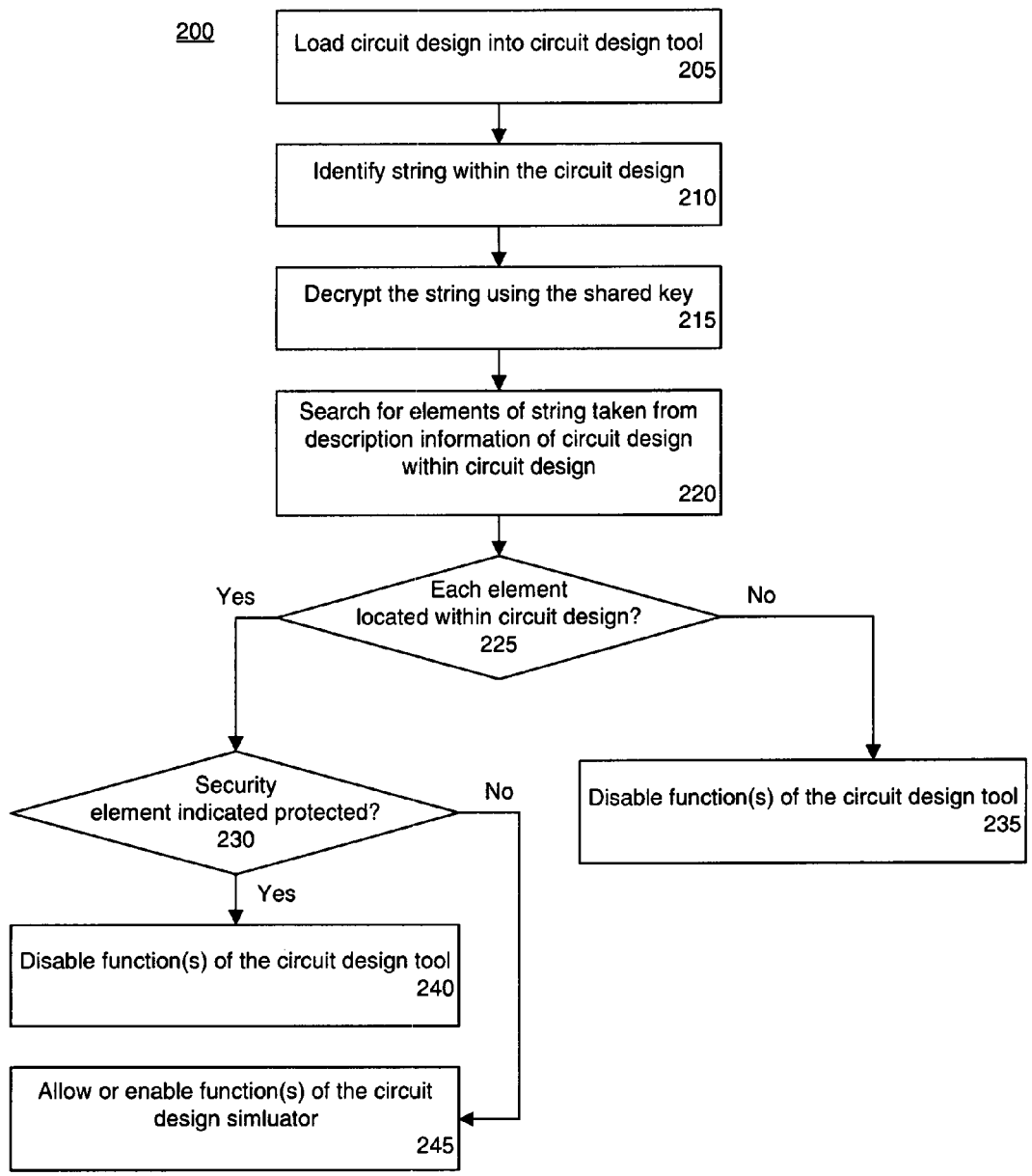
FIG. 2 is a flow chart illustrating a method of securing a circuit design in accordance with another embodiment of the present invention.

FIG. 2 is a flow chart illustrating a method 200 of securing a circuit design in accordance with another embodiment of the present invention. FIG. 2 illustrates one way that a circuit design that has been protected as described herein can be accessed or used within a circuit design tool. As noted, a circuit design tool can refer to a simulator or a synthesis tool. Accordingly, when a protected circuit design is loaded into a simulator, various aspects of the circuit design can be hidden from the user.

In the case of a synthesis tool, an optimized portion of logic that has been protected as described herein can be provided from a vendor. When loaded into a synthesis tool, the synthesis tool can perform the security checking functions and selectively disable one or more functions and/or enable one or more protectionist functions, thereby preventing access to the portion of logic. The protected logic can appear as a "black box" within the synthesis tool, whether a floor-planner, an FPGA editor, or the like.

Accordingly, in step 205, a circuit design that has been processed as described with reference to FIG. 1 can be loaded into a compliant circuit design tool. In step 210, the circuit design tool can locate the string within the circuit design. As noted, the string can be stored at a predetermined location within the circuit design such that the circuit design tool is able to locate the string within the object code or other protected form of the circuit design.

In step 215, the circuit design tool can decrypt the string using the key that is shared with the compiler. After decryption, the various elements of the string are known to, or ascertainable by, the circuit design tool. The elements of the string still are specified in a random order, e.g., the order established as a result of permuting the string in the compiler. Continuing with the prior example, the permuted string "ctl cnt protected in2 in1 out1" can be recovered. Since the circuit design tool is programmed with knowledge of the delimiter, the various elements of the string are identifiable by the circuit design tool. That is, the circuit design tool can distinguish or identify the individual elements taken from the description information of the circuit design and the security element(s).

In step 220, the circuit design tool can search the circuit design for the presence of each of the elements of the string originally taken from the circuit description information of the circuit design. The circuit design tool does not search for the security element(s). Each of the elements taken from the circuit description information should be included or specified at some point within the circuit design. If not, the circuit design tool can determine that the circuit design and/or string was altered in some fashion and that tampering has occurred.

For example, if the string is changed while encrypted, the elements recovered after decryption will be incorrect and not be specified or locatable within the circuit design. Thus, in step 225, the circuit design tool can determine whether each of the elements of the string, excluding the security element, was located or found within the circuit design. If so, the method can proceed to step 230. If not, the method can continue to step 235.

In step 230, where each element of the string was located within the circuit design, the circuit design tool can determine whether the security element indicates that the circuit design is protected. If so, the method can proceed to step 240. If not, the method can continue to step 245. In step 240, the one or more functions of the circuit design tool can be disabled. Since each element of the string was located, the circuit design tool need not prevent access to the entire circuit design, but rather disable only selected functions as noted, e.g., tracing, dumping, scoping, and/or any other function that may provide insight or information as to the internal workings of the circuit design. The circuit design can be used as a black box on its own or with one or more other circuit designs.

In step 245, the circuit design tool can determine that the circuit design was not tampered with and is not protected. Accordingly, no functions need be disabled or, alternatively, functions, such as those already described, can be enabled or activated with respect to the circuit design. In that case, the circuit design can be freely used with the circuit design tool either on its own or with one or more other circuit designs.

Continuing with step 235, in the case where one or more of the elements of the string were not located within the circuit design, the circuit design tool can disable one or more functions that provide some sort of access to the circuit design. In one embodiment, disabling one or more functions can refer to disabling functions such as tracing, dumping, scoping, or the like. In another embodiment, disabling a function can refer to the case where the circuit design tool simply does not permit any sort of access to the circuit design. For example, since one or more elements of the string were missing from the circuit design, indicating tampering, the circuit design tool can present a notification to the user that the circuit design is unusable and prevent the circuit design from being used or accessed in any manner whatsoever from within the circuit design tool.

The security measures described herein facilitate the distribution of IP in any of variety of different methods. For example, in one aspect of the present invention, two different compiler executables can be provided, for example, to an IP producing company or other entity. One compiler executable can use the protection measures described herein, while the other does not. The kernel of the circuit design tool can remain the same. If the entity chooses to protect selected IPs, those IPs can be precompiled by the entity using the compiler that is enabled to utilize the protection string. Other IPs that need not be protected can be precompiled using the non-security string-enabled compiler.

During elaboration time, the kernel of the circuit design tool can determine whether the design is to be protected or not. The IP consumer would use the precompiled versions for design implementation and, therefore, would be able to probe only those designs that are not protected. Such an embodiment can be useful for FPGA vendors that may supply compiler dumps of in-house design files, for example, as a library, and the FPGA user is able to utilize those design files within simulations.

The flowcharts in the figures illustrate the architecture, functionality, and operation of possible implementations of systems, methods and computer program products according to various embodiments of the present invention. In this regard, each block in the flowcharts may represent a module, segment, or portion of code, which comprises one or more portions of computer-usable program code that implements the specified logical function(s).

It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the flowchart illustrations, and combinations of blocks in the flowchart illustrations, can be implemented by special purpose hardware-based systems that perform the specified functions or acts, or combinations of special purpose hardware and computer instructions.

The present invention also can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein. The computer program product can include a computer-usable or computer-readable medium having computer-usable program code which, when loaded in a computer system, causes the computer system to perform the functions described herein. Examples of computer-usable or computer-readable media can include, but are not limited to, optical media, magnetic media, computer memory, or one or more portions of a wired or wireless network through which computer-usable program code can be propagated, or the like.

The terms "computer program", "software", "application", computer-usable program code, variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, a computer program can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

The terms "a" and "an", as used herein, are defined as one or more than one. The term "plurality", as used herein, is defined as two or more than two. The term "another", as used herein, is defined as at least a second or more. The terms "including" and/or "having", as used herein, are defined as comprising, i.e. open language.

This invention can be embodied in other forms without departing from the spirit or essential attributes thereof. Accordingly, reference should be made to the following claims, rather than to the foregoing specification, as indicating the scope of the invention.

What is claimed is:

1. A method of securing a circuit design comprising:

generating a string including a plurality of elements comprising design information elements selected from within the circuit design and at least one security element indicating whether the circuit design is protected, wherein generating a string further comprises randomly selecting a plurality of components of the circuit design and using a reference to each randomly selected component as one of the design information elements;

permuting the plurality of elements of the string;

encrypting, using a computer, the permuted string using a key shared with a circuit design tool independently from the circuit design; and including the permuted and encrypted string within the circuit design.

2. The method of claim 1, wherein including the string within the circuit design further comprises including the string within an object code version of the circuit design.

3. The method of claim 1, further comprising using a name of each selected component as the reference.

4. The method of claim 1, wherein permuting the plurality of elements of the string further comprises randomly permuting the plurality of elements of the string.

5. The method of claim 1, further comprising:

decrypting the permuted and encrypted string using the shared key; and selectively allowing access to the circuit design according to the unencrypted string.

6. The method of claim 5, wherein selectively allowing access to the circuit design further comprises:

determining whether each of the design information elements is specified within the circuit design and whether the circuit design is protected according to the security element; and selectively disabling at least one function of the circuit design tool according to the determining step.

7. The method of claim 5, wherein selectively allowing access further comprises:

determining that at least one of the design information elements is not specified within the circuit design; and if it is determined that at least one of the design information elements is not specified within the circuit design, disabling at least one function within the circuit design tool.

8. A method of providing access to a circuit design within a circuit design tool comprising:

loading a circuit design comprising a string indicating whether the circuit design is protected;

identifying the string within the circuit design;

decrypting, using a computer, the string using a shared key; and selectively allowing access to the circuit design according to a plurality of elements identified within the string, the plurality of elements corresponding to design information elements comprising randomly selected components of the circuit design and at least one security element.

9. The method of claim 8, wherein selectively allowing access further comprises:

determining that at least one of the design information elements is not specified within the circuit design; and if it is determined that at least one of the design information elements is not specified within the circuit design, disabling at least one function within the circuit design tool.

10. The method of claim 8, wherein selectively allowing access further comprises:

locating each of the design information elements within the circuit design;

determining that the security element indicates that the circuit design is protected; and disabling at least one function of the circuit design tool.

11. The method of claim 8, wherein selectively allowing access further comprises:

locating each of the design information elements within the circuit design;

determining that the security element indicates that the circuit design is not protected; and allowing access to the circuit design.

12. A computer program product comprising:

a non-transitory computer-usable medium having computer-usable program code that provides security for a circuit design, said computer program product including:

computer-usable program code that generates a string including a plurality of elements comprising design information elements selected from within the circuit design and at least one security element indicating whether the circuit design is protected, wherein the computer-usable program code that generates a string further comprises computer-usable program code that randomly selects a plurality of components of the circuit design and uses a reference to each randomly selected component as one of the design information elements;

computer-usable program code that permutes the plurality of elements of the string;

computer-usable program code that encrypts the permuted string using a key shared with a circuit design tool independently of the circuit design; and computer-usable program code that includes the permuted and encrypted string within the circuit design.

13. The computer program product of claim 12, wherein the computer-usable program code that includes the string within the circuit design further comprises computer-usable program code that includes the string within an object code version of the circuit design.

14. The computer program product of claim 12, further comprising computer-usable program code that uses a name of each component as the reference.

15. The computer program product of claim 12, wherein the computer-usable program code that permutes the plurality of elements of the string further comprises computer-usable program code that randomly permutes the plurality of elements of the string.

16. The computer program product of claim 12, further comprising:

computer-usable program code that decrypts the permuted and encrypted string using the shared key; and computer-usable program code that selectively allows access to the circuit design according to the unencrypted string.

17. The computer program product of claim 16, wherein the computer-usable program code that selectively allows access to the circuit design further comprises:
- computer-usable program code that makes a determination of whether each of the design information elements is specified within the circuit design and whether the circuit design is protected according to the security element; and
- computer-usable program code that disables at least one function of the circuit design tool according to the determination.

18. The computer program product of claim 16, further comprising:
- computer-usable program code that determines that at least one of the design information elements is not specified within the circuit design; and
- computer-usable program code that if it is determined that at least one of the design information elements is not specified within the circuit design, disables at least one function within the circuit design tool.

* * * * *